Aug. 26, 1969  J. HARRISON  3,463,298
TRAY CONSTRUCTIONS FOR CONVEYORS
Filed May 16, 1967  4 Sheets-Sheet 2
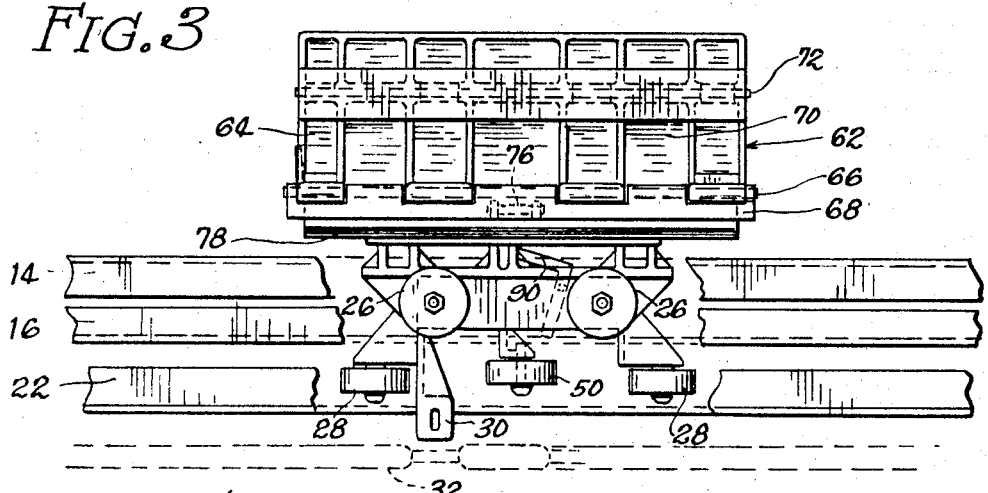
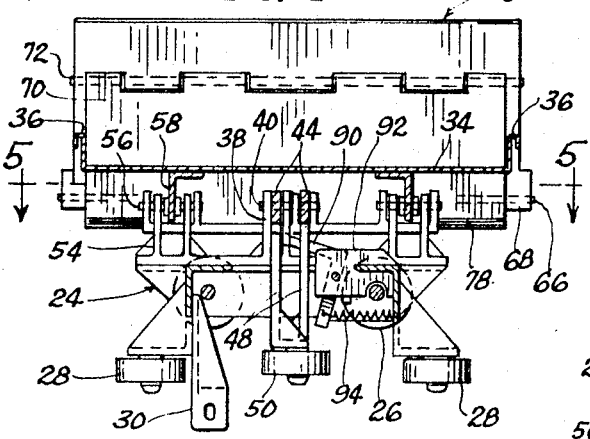
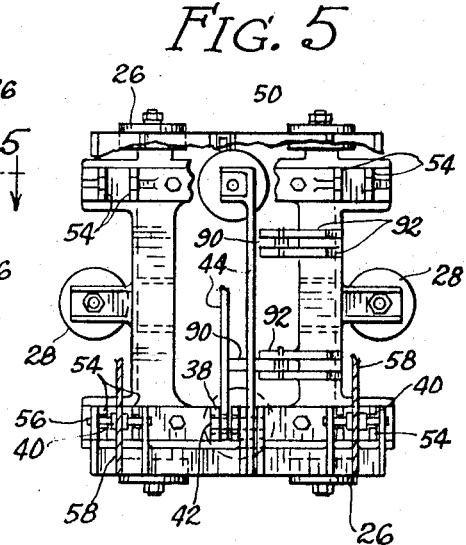
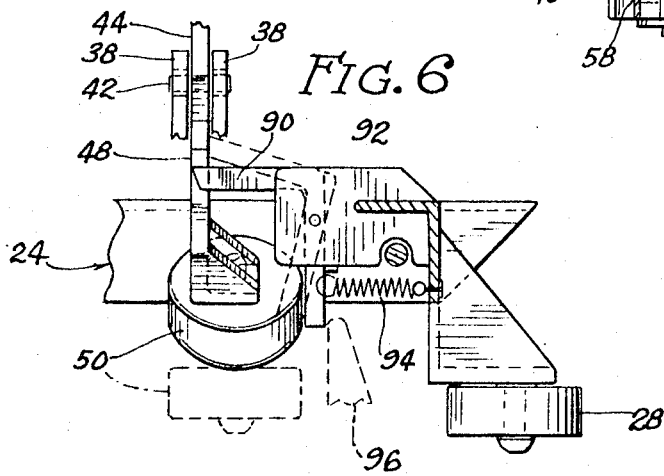

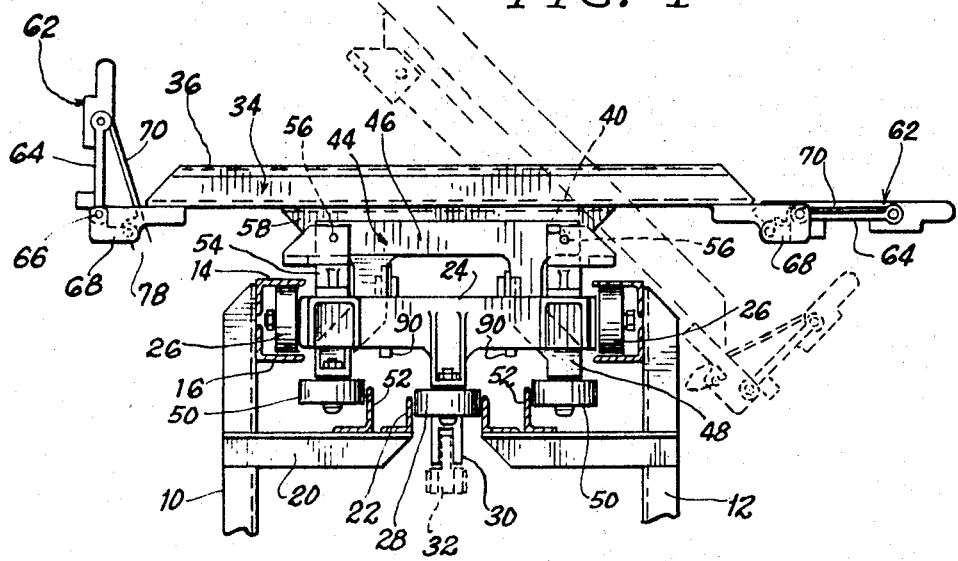

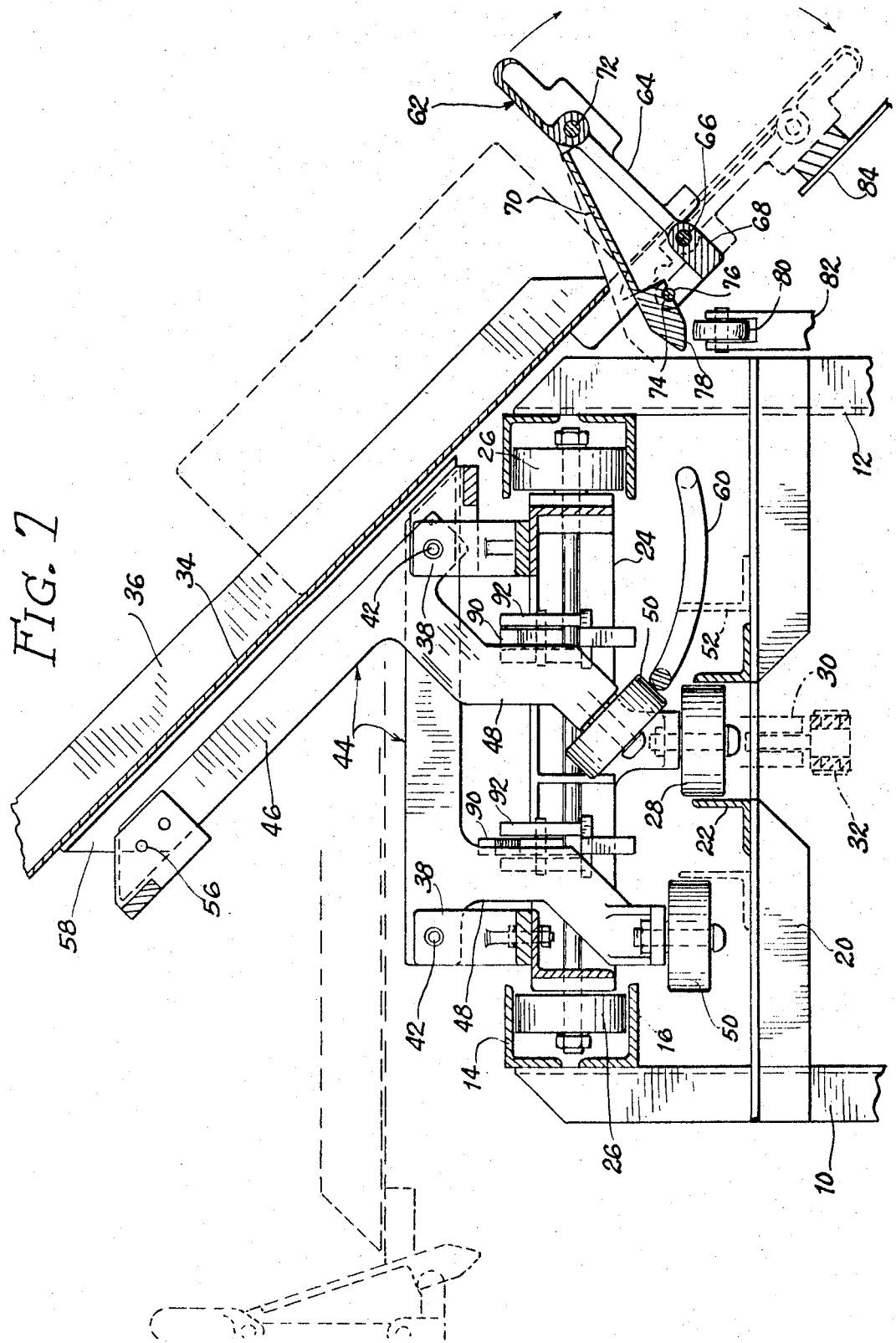

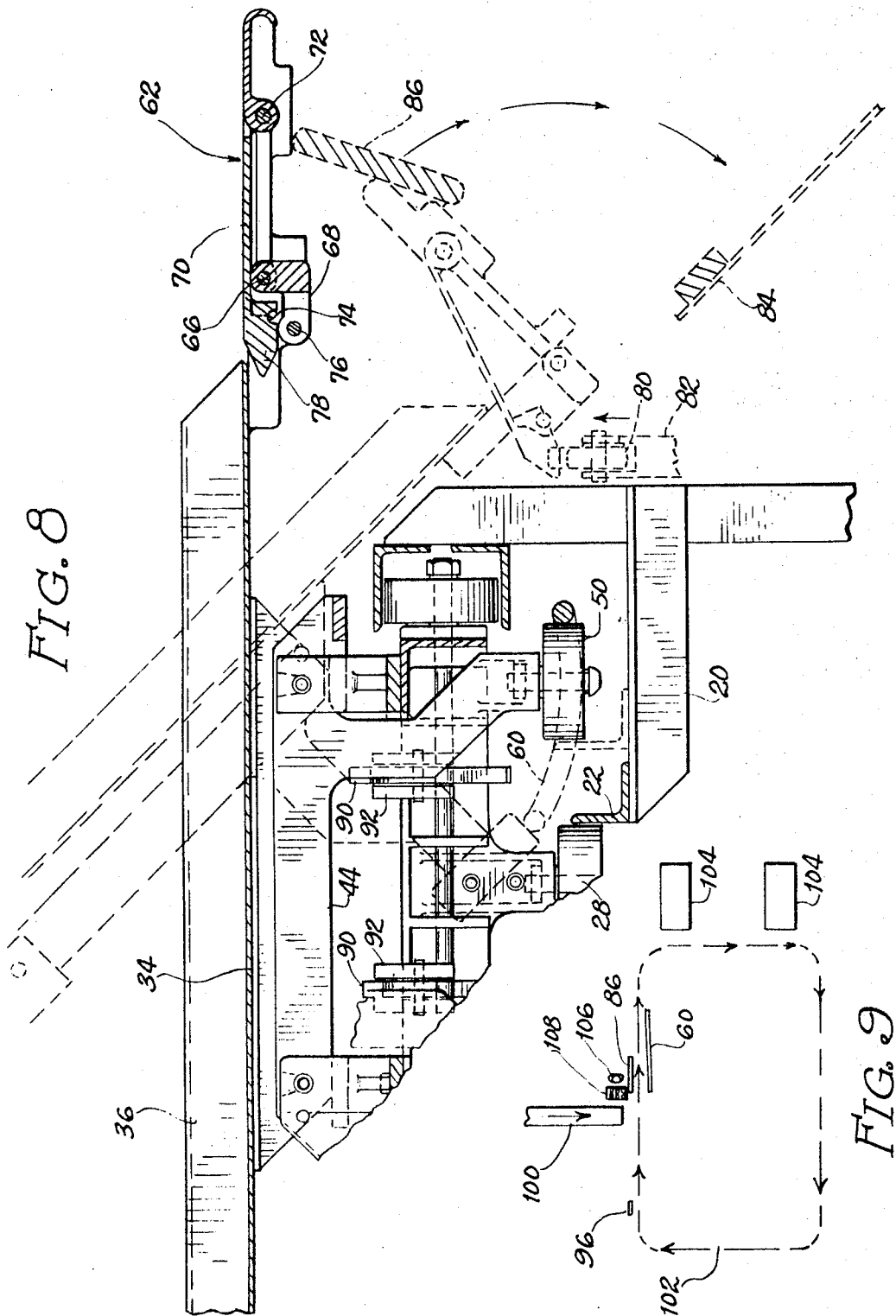

United States Patent Office 3,463,298
Patented Aug. 26, 1969

3,463,298
TRAY CONSTRUCTIONS FOR CONVEYORS
John Harrison, Lincolnwood, Ill., assignor to The Spra-Con Company, Chicago, Ill., a corporation of Illinois
Filed May 16, 1967, Ser. No. 638,876
Int. Cl. B65g 47/40
U.S. Cl. 198—155                           10 Claims

ABSTRACT OF THE DISCLOSURE

An article delivery system of the type including article carrying trays supported on a conveyor. Each of the trays is provided with gates at the discharge ends of the trays. The articles are carried in the trays to unloading stations while the trays are in a tilted position. Discharging of the articles is accomplished by releasing latching means for the gates. When the gates are unlatched, they swing down to positions which permit the articles to slide off the trays.

---

This invention relates to article conveyors, and it is particularly directed to tray constructions which are ideally suited for use in such conveyors.

Article conveyors are advantageously employed for a variety of purposes. One specific application for such conveyors comprises a sortation system wherein articles having some distinguishing characteristics are loaded on the conveyor. A plurality of unloading stations are located along the path of the conveyor. Means are provided for selectively discharging the articles, depending upon which of the unloading stations is to receive articles of a specified character.

Post office operations can readily employ systems of the type described. In such operations, a great deal of sorting must be undertaken in order to direct articles to appropriate destinations. Conveyors are desirably employed, particularly conveyors which are capable of automatically discharging articles at a desinted unloading station.

Patent No. 3,231,066 provides an illustration of the type of conveyor system which can be employed. In this prior construction, the trays are supported for tilting movement to either side of the conveyor. The tilting operation is provided by cam means which can be selectively operated so that only designated trays will tilt at a particular station.

Constructions of this type are subject to a great deal of mechanical stress. Specifically, the camming action which characterizes these constructions necessarily involves an impact between stationary members located along the conveyor length and moving members associated with the trays. When the impact occurs, particularly in high speed operations, high stress can result leading to mechanical failure.

Application Ser. No. 602,810, now Patent No. 3,386,-563, describes a conveyor construction which includes trays of an improved design. This new tray design overcomes many of the problems which characterize prior designs. The tray constructions tend to minimize the likelihood of mechanical failure by uniformly distributing stress in the tray constructions rather than allowing concentrated stress to act on a single part or a few parts. The tray constructions described in this application provide several other advantages when compared with prior constructions.

As indicated, the copending application discloses a system which minimizes the danger of mechanical breakage by distributing the stresses due to impact during tilting. It is a general object of this invention to provide further improvements in conveyor constructions whereby impact forces can be substantially eliminated to thereby further minimize the danger of mechanical failure.

Other objects and advantages of this invention will appear hereinafter and for purposes of illustration but not of limitation, specific embodiments of the invention are shown in the accompanying drawings in which:

FIGURE 1 is an elevational view of a tray construction characterized by the features of this invention;

FIGURE 2 is a plan view of a construction of the type shown in FIGURE 1;

FIGURE 3 is a side elevation of the tray construction;

FIGURE 4 is a vertical, sectional view of the tray construction;

FIGURE 5 is a horizontal, sectional view taken about the line 5—5 of FIGURE 4;

FIGURE 6 is an enlarged detail view illustrating means for locking a tray in a tilted position;

FIGURE 7 is an enlarged elevational view of a tray construction in the tilted position;

FIGURE 8 is an enlarged elevational view of the tray construction in the horizontal position with the gate open; and FIGURE 9 is a schematic illustration of a conveyor system suitable for the incorporation of the concepts of this invention.

This invention generally relates to a delivery system which includes a plurality of article carrying trays mounted on a conveyor. The conveyor provides for transporting of the trays past an article loading station and thereafter past a plurality of unloading stations whereby the articles can be selectively discharged. The trays are adapted to be tilted to either side of the conveyor with the tilting axis being substantially in line with the direction of conveyor movement.

The specific improvements of this invention relate to the manner in which the trays are utilized during article carrying and discharge as well as to the construction of the trays. Specifically, articles are carried to the unloading stations in trays which are in tilted position. Gates are provided at the discharge ends of the trays whereby the articles cannot pass out of the trays until the gates are opened. Means are provided at each unloading station for selectively opening the gates of trays which carry articles to be discharged at a particular station.

The conveyor system illustrated in the drawings includes trays having structural and operating characteristics similar to the tray structures described in application Ser. No. 602,810 now Patent No. 3,386,563. As noted in said application, the conveyor comprises a stationary framework including vertically disposed, laterally spaced apart upright frame members 10 and 12. These uprights are interconnected by upper and lower lengthwise extending L-shaped bars 14 and 16. These bars define guide slots or rails for supporting the trays.

Rigid structural members 20 extend inwardly from the vertical supports 10 and 12. These structural members carry L-shaped lengthwise extending elements 22 which also serve as guides for the conveyor trays.

The trucks which support the conveyor trays comprise rectangular frame members 24. Wheels 26 are supported by this frame member, and these wheels ride in the guide slots provided by the L-shaped members 14 and 16. Centrally supported wheels 28 ride in the central guide slot provided by the L-shaped members 22. A bracket 30 extends downwardly from the frame 24 and a driving chain 32 is connected to this bracket. It will be apparent that a plurality of trucks of the type described can be connected in series along the length of the conveyor path.

The upright portion of the article carrying means comprises a flat tray 34 which may include upstanding leading and trailing edges 36 to assist in maintaining articles on the tray surface. Means are provided on the bottom side of the tray for interconnection with the truck frame so that the tray will be supported at a plurality of points, preferably at the corners, when in a horizontal position. This provides a stable surface particularly if the tray is to be loaded when in the horizontal position. The support means are also designed so that the tray can be tilted so that discharge of articles can be accomplished in the manner to be described.

In the horizontal position, the tray is supported by means of a plurality of vertically extending supports. Centrally located supports 38 are mounted directly on the rectangular frame 24. These supports 38 define pivotal means 40 which receive horizontally extending pins 42 connected to bell crank levers 44. These levers include normally horizontal arm portions 46 and normally vertically disposed arm portions 48. Wheels 50 are secured to the bottom end of the arms 48, and these wheels normally ride against L-shaped rails 52 which are mounted on the supports 20.

Additional vertically extending supports 54 are located at the corners of the frame 24. These supports also define slots 40 which receive pins 56 connected to L-shaped members 58 secured to the bottom of the trays. As described in the aforementioned application, tilting of the trays is accomplished when the wheels 50 engage a cam such as the cam 60 shown in FIGURE 7. This results in a pivoting of the crank levers to lift the trays to a tilted position. It will be understood that the disclosure of the aforementioned application is incorporated herein by reference to provide details relative to the tray tilting. It will also be understood that the concepts of this invention are applicable to truck and tray constructions of other designs.

Each of the trays in the conveyor construction illustrated is provided with a gate 62 at each discharge end. The gate consists of a main plate portion 64 which is pivotally secured at 66 to bracket 68. This bracket is in turn secured to the underside of the tray.

A latch plate 70 is pivotally attached to the gate at 72. The lower end of the latch plate defines a horizontally extending groove 74 which receives a latch pin 76 attached to the bracket 68. As illustrated in FIGURES 1 and 7, this latching arrangement will maintain the gate in a closed position in either the horizontal or tilted condition of the tray.

The gate 62 is opened by moving the latch plate 70 out of engagement with the pin 76. An extension 78 is provided on the latch plate for this purpose. A roller 80 mounted on a vertically reciprocating member 82 is provided for purposes of engaging the extension 78. As shown in FIGURES 7 and 8, this roller is adapted to move upwardly into contact with the extension 78 whereby the extension will move to the dotted line position. (FIGURE 7). As soon as the latch plate is moved away from the pin 76, the gate is free to swing downwardly in response to the force of gravity. It will be appreciated that spring means could be provided to assist or retard movement of the gate to thereby combine maximum operating efficiency with minimum stress on the structural elements.

In a typical operation involving use of the described construction, an article will be loaded on a tray when the tray is in a horizontal position with the gate open as shown in FIGURE 8. Thereafter, the tray will be tilted by means of a cam such as shown at 60, and the article will be transported to unloading bins with the tray in this tilted condition.

When a desired unloading position is reached, the wheel 80 will be moved upwardly to thereby trip the latch plate at which time the gate will swing open to permit discharge of the article on the tray. The leading edge of the bin can extend as shown at 84 so that an uninterrupted path is provided for the article as it moves from the tray into the bin.

It will be noted that as an article is carried in a tilted tray with the gate closed, the article will be in direct contact with the latch plate 70. During the unlatching operation, the latch plate will have an initial movement against the corner of the article whereby the article will be pushed upwardly and rearwardly. This provides an extremely important feature in that the influence of static friction on the articles is greatly minimized. Thus, a flat package may have sufficient contact with the tray surface so that it will not slide off without some initial force being applied to it. The design of the latch plate is such that this initial force is automatically provided during opening of the gate.

Once the initial upward movement of the latch plate takes place, further movement is such that the article will be completely unimpeded by any elements of the gate. Thus, the latch plate 70 assumes a position which is flush with the tray surface and with the outer gate surface.

Cam means are also provided for restoring the gates to a closed position after an unloading operation. These cam means may comprise a bar situated at the side of the conveyor such as the bar 86 shown in FIGURE 8. The bar may be of curved configuration to provide for gradual closing in the same manner as the cam 60 provides for gradual tilting of the trays. It is also contemplated that the bar 86 could be located in the same position as the cam 60 whereby the gate would be closed as the tray is being tilted. It will be understood that the gate could be closed before or after loading of an article so long as the gate is closed at a time sufficient to prevent discharge of an article before the proper unloading bin is reached. Similarly, the trays could be tilted before or after an article is loaded on the trays.

Since the trays will be carrying articles for relatively long distances, means are preferably provided for locking the tray in a tilted position. Thus, under normal circumstances the trays would fall by gravity to a horizontal position as soon as the wheel 50 is out of contact with the cam 60. This must be avoided since the trays must be in the tilted position to accomplish discharge of the articles.

The locking means consists of a pair of levers 90 pivotally mounted on brackets 92. These brackets are secured on the frame 24. As shown in FIGURE 3, one arm of the lever normally extends at an angle to the horizontal toward the center of the truck. These arms bear against side walls of the section 48 of each bell crank lever 44.

When one of the bell crank levers pivots during tray tilting, the locking lever 90 will bear on the wall of the section 48 until this section pivots beyond the locking lever. A spring 94 is attached to the locking lever so that it will snap into position against the edge of the section 48. When the wheel 50 moves beyond the cam 60, the lever will prevent movement of the trays back to the horizontal position.

A cam 96 (FIGURE 6) can be provided for engaging the lower end of the locking lever 90 to release the tray. Obviously, only a short pivoting movement is required to free the section 48 whereby the tray will return to the horizontal position.

FIGURE 9 illustrates schematically a conveyor arrangement suitable for incorporation of the structures described. This arrangement consists of a delivery conveyor 100 along which packages to be sorted can be transported. The conveyor trays move past this delivery conveyor along the path designated by the line 102. The articles are preferably loaded on the trays when they are in the horizontal position with the gate open. Accordingly, the cam 96 is positioned ahead of the loading station so that all trays coming to the loading station will be in the horizontal position.

After the articles are loaded, the gate 62 for each tray must be closed, for example, by means of a camming bar 86. During or subsequent to the closing operation, the trays are tilted by means of a cam 60. The trays are now ready for movement to one of the unloading bins 104 which may be located at several points along the path of the conveyor.

The concept of tilting the trays before reaching any of the unloading bins provides certain distinct advantages. It has been recognized that space is a prime consideration in most installations where conveyor systems of the type described are employed. Accordingly, it is desirable to provide a maximum number of unloading bins along the path of a conveyor. Where the trays are tilted immediately before unloading, the tilting action must take place within a short space.

Speed is also an initial requirement in such installations and, therefore, the conveyor trays will be approaching the unloading bins at a relatively rapid rate. This combination of high speed and tilting within a very short space results in high impact forces. The concepts of this invention eliminate this disadvantage since the cam 60 can have any desired length and, therefore, the tray tilting will take place at a gradual rate even though the conveyor may be moving at a high speed. The unloading operation merely involves a slight impact to achieve unlatching of the gates. High stresses on important structural members will, therefore, not result.

It will be noted that FIGURE 9 illustrates camming means which will enable tilting to one side of the conveyor. Obviously, the construction described is suited for tilting to either side whereby maximum utilization of space is provided. In order to accommodate camming means for tilting on both sides of the conveyor, means can be included in the system which will prevent interference between camming means on one side with trays which are to be tilted by the camming means on the other side. This can be accomplished in various ways including the use of camming means on movable supports or by providing movable supports for the wheels 50.

The system of this invention can be used as an automatic sortation system. Thus, an operator shown at 106 can code each article loaded on the conveyor by means of a console 108. The code will serve to operate the mechanisms controlling the unlatching roller 80. The system will then be entirely analogous to control systems such as described in Speaker Patent No. 3,034,665. As in the case of the patent disclosure, coding devices can be incorporated in this system which are capable of synchronization with the tray movement whereby an electrical signal will be generated when the tray reaches a location corresponding to a particular code. This electrical signal can then be utilized for actuation of the unlatching mechanisms for opening the gate 62.

It will be understood that various changes and modifications may be made in the above described constructions which provide the characteristics of this invention without departing from the spirit thereof particularly as defined in the following claims.

That which is claimed is:

1. In an article delivery system wherein a plurality of individual article carrying means are provided on a conveyor, said conveyor including means for transporting the article carrying means past at least one article loading station, and for thereafter transporting the article carrying mens past a plurlity of unloading stations whereby articles loaded on the article carrying means can be selectively discharged, said article carrying means comprising trays adapted to tilt in at least one direction, the tilting axis being substantially in line with the direction of conveyor movement, the improvement comprising means for tilting each of said trays, said tilting means being located at a tilting station which operates to tilt a plurality of trays passing the tilting station, and wherein said tilting means comprise camming means which extend for a distance substantially longer than the length of a tray whereby said trays are tilted gradually with a minimum of impact between structural elements of the tray and the camming means, said tilting station being at a separate location in said system relative to said unloading stations whereby tilted trays will be transported to the unloading stations with articles in the trays, each of said trays including a stop means secured at at least one end whereby the stop means will hold articles within the trays as the trays are transported from said tilting means to said unloading stations, and means for removing said stop means when the trays have been transported to appropriate unloading stations for discharge of articles.

2. A system in accordance with claim 1 wherein said stop means comprises a gate extending upwardly at at least one end of each tray, and wherein a gate opening means is positioned at each unloading station, and including means for selectively operating said gate opening means depending upon the station at which said articles are to be discharged.

3. A system in accordance with claim 2 wherein said gates are pivotally connected at the ends of said trays, a latch provided on each tray for holding an associated gate in a closed position, unlatching means associated with each latch, said gate opening means comprising means for actuating said unlatching means, means for selectively interposing said actuating means into the path of movement of said unlatching means for engagement with the unlatching means to thereby release said gate.

4. A system in accordance with claim 3 wherein said unlatching means comprises an extension formed on said latch, said actuating means comprising a movably mounted abutment adapted to be interposed for engagement with said extension.

5. In an article delivery system wherein a plurality of individual article carrying means are provided on a conveyor, said conveyor including means for transporting the article carrying means past at least one article loading station, and for thereafter transporting the article carrying means past a plurality of unloading stations whereby articles loaded on the article carrying means can be selectively discharged, said article carrying means comprising trays adapted to tilt in at least one direction, the tilting axis being substantially in line with the direction of conveyor movement, the improvement comprising a combination of means for tilting each of said trays, said tilting means being located whereby tilted trays will be transported to the unloading stations with articles in the trays, each of said trays including a gate secured at at least one end whereby the gate will hold articles within the trays after tilting and before discharging, and means for opening said gates when the trays have been transported to appropriate unloading stations for discharge of articles, one of said gate opening means being positioned at each unloading station, and means for selectively operating the gate opening means, said gates being pivotally connected at the ends of said trays, a latch provided on each tray for holding an associated gate in a closed position, unlatching means associated with each latch, said gate opening means comprising means for actuating said unlatching means, means for selectively interposing said actuating means into the path of movement of said unlatching means for engagement with the unlatching means to thereby release said gate, and wherein said gates are each positioned substantially perpendicular to the bottom wall of an associated tray when the gate is in a closed position, and wherein said latch comprises a plate having one end attached to an upper portion of said gate with the other end, including said extension, being positioned beneath the surface of said tray.

6. A system in accordance with claim 5 including a groove formed in said other end of said plate, a pin fixed to said tray adapted to be received in said groove to thereby latch the gate in the closed position, and wherein the unlatching operation causes the gate to swing to an open position under the influence of gravity.

7. A system in accordance with claim 6 including cam means adjacent the path of said conveyor adapted to engage gates in an open position, said cam means forcing said open gates to swing upwardly until the gates latch in a closed position.

8. A system in accordance with claim 7 wherein said gates are positioned at either end of a tray, and including means for tilting the trays in either direction.

9. A system in accordance with claim 5 wherein an article positioned on a tilted tray slides into abutting relationship with said plate when the gate is in closed position, and wherein the unlatching action results in an initial upward movement of said plate to thereby lift the article abutting the plate whereby static friction is minimized as the article begins sliding off the tray.

10. In an article delivery system wherein a plurality of individual article carrying means are provided on a conveyor, said conveyor including means for transporting the article carrying means past at least one article loading station, and for thereafter transporting the article carrying means past a plurality of unloading stations whereby articles loaded on the article carrying means can be selectively discharged, said article carrying means comprising trays adapted to tilt in at least one direction, the tilting axis being substantially in line with the direction of conveyor movement, the improvement comprising means for tilting each of said trays, said tilting means being located at a tilting station which operates to tilt a plurality of trays passing the tilting station, said tilting station being at a separate location in said system relative to said unloading stations whereby tilted trays will be transported to the unloading stations with articles in the trays, each of said trays including a stop means secured at at least one end whereby the stop means will hold articles within the trays as the trays are transported from said tilting means to said unloading stations, and means for removing said stop means when the trays have been transported to appropriate unloading stations for discharge of articles, means for locking said trays in a tilted position, said locking means comprising an arm adapted to fit into engagement with a tray when the tray assumes a tilted position, and including means for moving said arm out of engagement with a tilted tray for restoring the tray to a horizontal position.

References Cited

UNITED STATES PATENTS

| | | | |
|---|---|---|---|
| 2,969,137 | 1/1961 | Baumann et al. | 198—38 |
| 3,021,967 | 2/1962 | Patzold et al. | 198—38 |
| 3,034,665 | 5/1962 | Speaker | 198—181 X |
| 3,233,720 | 2/1966 | Atanasoff et al. | 198—185 X |

FOREIGN PATENTS

| | | |
|---|---|---|
| 1,167,597 | 8/1958 | France. |

EDWARD A. SROKA, Primary Examiner